United States Patent Office 3,666,415
Patented May 30, 1972

3,666,415
SYNTHESIS OF AMMONIA
Alexander Harmens, Altrincham, England, assignor to Petrocarbon Developments Limited, Wythenshawe, Manchester, England
Filed Sept. 16, 1970, Ser. No. 72,570
Claims priority, application Great Britain, Sept. 30, 1969, 48,080/69
Int. Cl. C01c 1/04
U.S. Cl. 23—199    5 Claims

ABSTRACT OF THE DISCLOSURE

In a process for the synthesis of ammonia by reaction of nitrogen with hydrogen in a reactor with recycling of unreacted gases, the hydrogen is derived from helium-containing natural gas and the impurities content of the process gas fed to the reactor is maintained constant by withdrawing a purge gas stream from the recycled gases, treating it to remove methane and argon, removing a helium-containing bleed stream before or after said treatment and returning the remainder of the purge stream to ammonia reactor.

---

Figure 1:
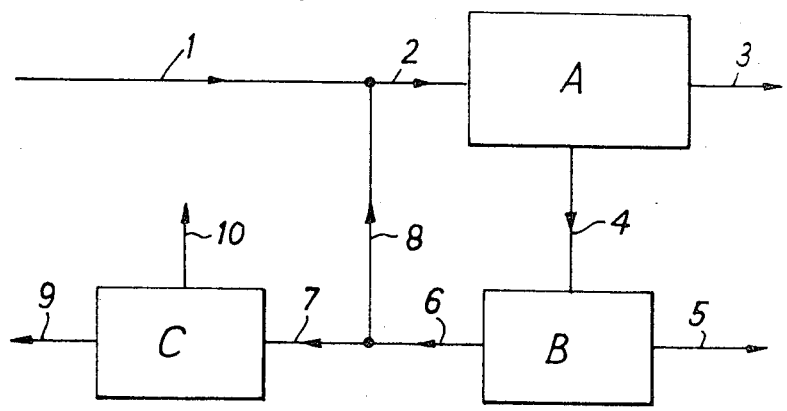

This invention relates to processes for the production of ammonia from ammonia synthesis gas, i.e., from a mixture of 3 parts hydrogen and 1 part nitrogen, and more particularly to the conservation of hydrogen in such processes.

The synthesis gas used in commercial processes normally contains as impurities methane (about 1 mole percent) introduced with the hydrogen, and argon (about 0.3 mole percent introduced with the nitrogen, which take no part in the reaction and are separated, together with unreacted hydrogen and nitrogen, from the ammonia which is formed in the reactor. The mixture of unreacted hydrogen and nitrogen containing methane and argon impurities is recirculated to the reactor and the impurities are allowed to accumulate in the reaction gas mixture to a certain concentration, usually up to about 15 mole percent. To prevent the impurities content increasing above the selected level, a purge stream is continuously withdrawn from the unreacted gas mixture which is being recycled.

The purge gas contains as its major component hydrogen (usually about 63 mole percent), nitrogen (usually about 21 mole percent), methane and argon. Hydrogen is the most valuable component, and methods for its recovery from ammonia synthesis purge gas are known, see, for example, our British Patent No. 1,057,020. When the source of hydrogen for the ammonia synthesis process is such that the impurites, and especially the impurities other than nitrogen, can readily be separated substantially completely from the hydrogen in the purge gas, the recovered hydrogen, which may still contain some nitrogen, can be reused in the ammonia synthesis process. This is the case when the hydrogen is obtained from coke-oven gas or from the steam reforming of propane or liquid hydrocarbons.

An attractive source of hydrogen at the present time is natural gas, the hydrogen being obtainable by steam reforming of the predominant component, methane, of the natural gas. However, many natural gases contain helium which is recovered with the hydrogen from the reforming process. Though the proportion of helium in the hydrogen is very small, e.g. about 0.025 mole percent, if the hydrogen is used for the synthesis of ammonia with recycling of unreacted gases the helium will, like the methane and argon, accumulate in the process gas and be removed with the pure gas. If hydrogen is to be recovered from this purge gas for re-use, the hydrogen recovery unit must separate hydrogen from all contaminants, including helium. The known hydrogen recovery process does not achieve such a separation: it leaves the helium in the hydrogen.

It has now been found that though the helium in the purge gas stream is not separated from the hydrogen in the hydrogen recovery process in which methane, argon and most of the nitrogen are separated by condensation at low temperatures, most of the helium-containing recovered hydrogen can be returned to the ammonia synthesis process, the remainder being withdrawn as a bleed gas stream. Helium may be recovered from this gas stream, if desired.

Thus according to the invention, in a process for the synthesis of ammonia by reaction of nitrogen with hydrogen in a reactor with recycling of unreacted gases, the hydrogen is derived from helium-containing natural gas, and the impurities content of the process gas fed to the reactor is maintained at a constant level by withdrawing a purge gas stream from the gases being recycled, treating the purge gas stream by a low temperature partial condensation process for the removal of methane and argon therefrom as an effluent, removing a bleed stream from the purge gas stream before or after the treatment for the removal of the methane and argon, and returning the remainder of the purge stream to the ammonia reactor; the effluent stream from the low temperature partial condensation process and the bleed stream each being withdrawn at a rate such that the methane, argon and helium are removed from the system at the same rate as they are introduced with fresh synthesis gas feed to the ammonia reactor. The purge gas stream, which is withdrawn continuously, is such that the methane and argon are removed at substantially the same rate as they are introduced with fresh synthesis gas feed, the recovered and recycled hydrogen stream being substantially free of methane and argon. However, the amount of helium removed with the purge gas stream is in excess of that introduced with the fresh synthesis gas feed, part of the removed helium being recycled with the recovered hydrogen to the process gas. By removing helium with the bleed stream at the same rate as it is introduced with the fresh synthesis gas feed, a substantially stable composition of the reaction gas mixture introduced into the ammonia reactor is maintained.

It will be understood that most of the nitrogen in the purge gas stream may be removed therefrom by the low temperature partial condensation process for the removal of the methane and argon.

Figure 2:
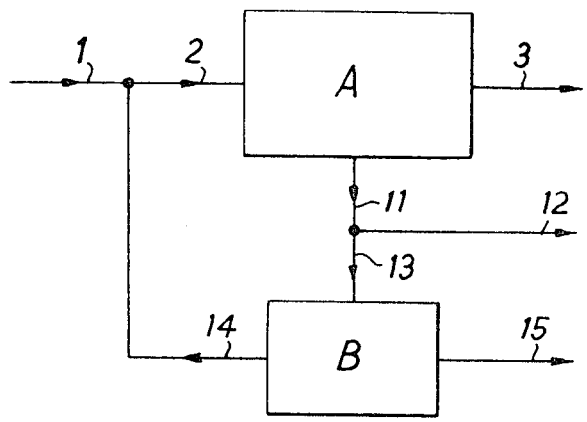

Two embodiments of the invention are illustrated by the flow diagrams shown in FIGS. 1 and 2 of the accompanying drawings.

Referring to the diagram of FIG. 1, block A represents the ammonia unit comprising a conventional ammonia reactor with its associated equipment, namely condensers, separators and means for recycling unreacted gas, which has been separated from the ammonia product, back to the reactor. Block B represents a hydrogen recovery unit, e.g. a unit of the kind described in British patent specification No. 1,057,020, and block C represents a helium recovery unit.

In operation, the fresh synthesis gas feed after compression to the required pressure is fed through pipeline 1, being joined by recovered hydrogen, also compressed to the required extent and fed thereto through pipeline 8. The resulting mixture passes through pipeline 2 to the ammonia unit. The ammonia formed is separated by condensation from the reactor effluent and leaves by pipeline 3. The residue of the effluent, consisting of unreacted hydrogen and nitrogen and the impurities argon, methane and helium, is recycled to the reactor inlet, a constant amount being continuously withdrawn therefrom as a purge gas stream through pipeline 4. The amount withdrawn as the purge gas stream is such that the amount of argon and methane taken out of the gases being recycled (as the effluent from the low temperature partial condensation process) is the same as that entering with the fresh feed gas in pipeline 1. The purge gas stream passes to the hydrogen recovery unit B, in which substantially all the argon and methane and a major proportion of the nitrogen are separated by low temperature partial condensation and are discarded as effluent through pipeline 5. The residual hydrogen concentrate, containing the helium and some nitrogen, is recirculated through pipelines 6 and 8 to join the fresh feed entering through pipeline 1, a bleed gas stream being withdrawn therefrom through pipeline 7. The amount of bleed gas stream withdrawn through pipeline 7 is such that the amount of helium withdrawn therewith is the same as that being introduced with the fresh gas feed. As illustrated in the drawing, as an optional feature the bleed stream 7 may be passed to a helium recovery unit C, the helium being withdrawn therefrom through pipeline 9. The remaining stream, which is substantially pure hydrogen, leaves the system through pipeline 10 and could be recompressed and fed back to join the fresh feed entering the system through line 1. This feature may be omitted if the recovery of helium is not required.

An alternative embodiment of the invention, which is preferable in the case where it is not intended to recover helium from the bleed stream, is illustrated by the flow diagram in FIG. 2, in which reference numerals 1, 2 and 3 and blocks A and B represent the same operational parts as in FIG. 1.

In accordance with this embodiment, the purge gas stream is withdrawn through a pipeline 11, and a bleed stream is removed through pipeline 12 prior to feeding the purge gas stream to the hydrogen recovery unit B. The argon, methane and nitrogen separated in the hydrogen recovery unit are discarded through pipe 15 and the residual hydrogen concentrate is recirculated through pipeline 14 to join the fresh feed entering the reactor through pipeline 1.

The amount of purge stream withdrawn through pipeline 11 is such that the amount of argon and methane taken out of the gases being recycled is the same as that entering with the fresh feed gas in pipe 1 and the amount of bleed stream withdrawn through pipeline 12 is such that the amount of helium removed therewith is the same as that being introduced with the fresh gas feed. As the bleed stream is withdrawn from the purge gas stream before treatment of the latter to recover hydrogen, it will be seen that with the use of the alternative embodiment, smaller hydrogen recovery units may be used for the same ammonia production with the concomitant economic advantage.

The processes described above using a helium and methane containing source of hydrogen and an argon containing source of nitrogen enable hydrogen concentrate recovered from the purge gas stream to be fed back to the process with the maintenance of a substantially stable composition of the gas mixture subjected to reaction in the ammonia reactor.

The following tables show the compositions and flow rates of the various stream shown in the drawings (numbered in accordance with the pipeline numbers therein) for an installation designed to produce 1,000 tons per 24 hours of ammonia, using North Sea natural gas containing 0.04 mole percent helium as a source for the hydrogen. Table 1 refers to the process illustrated in FIG. 1 and Table 2 refers to the process illustrated in FIG. 2.

TABLE 1

| Stream number | 1 | 2 | 3 | 4 | 5 | 6 | 7 | 8 | 9 | 10 |
|---|---|---|---|---|---|---|---|---|---|---|
| Composition (mole percent): | | | | | | | | | | |
| $NH_3$ | | | 100.000 | | | | | | | |
| $H_2$ | 72.584 | 73.785 | | 63.3 | 11.0 | 90.7 | 90.7 | 90.7 | 97.8 | |
| $N_2$ | 26.198 | 24.595 | | 21.1 | 57.5 | 2.0 | 2.0 | 2.0 | 2.2 | |
| $CH_4$ | 0.900 | 0.840 | | 8.1 | 23.6 | | | | | |
| Ar | 0.300 | 0.280 | | 2.7 | 7.8 | | | | | |
| He | 0.018 | 0.500 | | 4.8 | 0.1 | 7.3 | 7.3 | 7.3 | | 100.0 |
| Total | 100.000 | 100.000 | 100.000 | 100.0 | 100.0 | 100.0 | 100.0 | 100.0 | 100.0 | 100.0 |
| Mol. weight | 9.057 | 8.644 | 17.031 | 9.757 | 23.235 | 2.681 | 2.681 | 2.681 | 2.588 | 4.002 |
| Flow rate: | | | | | | | | | | |
| Tons/hr | 46.23 | 47.20 | 41.67 | 5.53 | 4.53 | 1.00 | 0.0263 | 0.97 | 0.0234 | 0.0029 |
| Norm. m.³/hr | 114,264 | 122,372 | 54,839 | 12,694 | 4,367 | 8,327 | 219 | 8,108 | 203 | 16 |

TABLE 2

| Stream number | 1 | 2 | 3 | 11 | 12 | 13 | 14 | 15 |
|---|---|---|---|---|---|---|---|---|
| Composition (mole percent): | | | | | | | | |
| $NH_3$ | | | 100.0 | | | | | |
| $H_2$ | 72.585 | 73.785 | | 63.3 | 63.3 | 63.3 | 90.7 | 11.0 |
| $N_2$ | 26.197 | 24.595 | | 21.1 | 21.1 | 21.1 | 2.0 | 57.5 |
| $CH_4$ | 0.900 | 0.840 | | 8.1 | 8.1 | 8.1 | | 23.6 |
| Ar | 0.300 | 0.280 | | 2.7 | 2.7 | 2.7 | | 7.8 |
| He | 0.018 | 0.500 | | 4.8 | 4.8 | 4.8 | 7.3 | 0.1 |
| Total | 100.000 | 100.000 | 100.0 | 100.0 | 100.0 | 100.0 | 100.0 | 100.0 |
| Mol. weight | 9.067 | 8.644 | 17.031 | 9.757 | 9.757 | 9.757 | 2.681 | 23.236 |
| Flow rate: | | | | | | | | |
| Tons/hr | 46.225 | 47.194 | 41.671 | 5.523 | 0.148 | 5.375 | 0.969 | 4.406 |
| Norm. m.³/hr | 114,268 | 122,372 | 54,839 | 12,694 | 340 | 12,354 | 8,104 | 4,250 |

It will be noted that the fresh feed gas intake (line 1) in Table 2 is virtually the same as that in Table 1, thus indicating that the process illustrated in FIG. 2 is, surprisingly, as efficient in hydrogen usage as that illustrated in FIG. 1. However, the feed to the hydrogen recovery unit (stream 4 in Table 1 and stream 13 in Table 2) is smaller in the case of the second process.

The bleed stream (12) of the second process is less suitable for the recovery of helium than stream 7 of the first process as it contains less helium.

Known methods may be used for the recovery of helium.

I claim:

1. In a process for the synthesis of ammonia by reaction of nitrogen with hydrogen in a reactor with recycling of unreacted gases, the improvement which comprises deriving the hydrogen from helium-containing natural gas, and maintaining at a constant level the impurities content of the reactant gas fed to the reactor by withdrawing a purge gas stream from the gases being recycled, treating the purge gas stream by a low temperature partial condensation process for the removal of methane and argon therefrom as effluent, removing a bleed stream from the purge gas stream before or after the treatment for the removal of the methane and argon, and returning the remainder of the purge stream to the ammonia reactor; the effluent from the low pressure partial condensation process and the bleed stream each being withdrawn at a rate such that the methane, argon and helium are removed at the same rate as they are introduced with fresh synthesis gas feed to the ammonia reactor.

2. A process as claimed in claim 1 in which the bleed stream is removed from the purge gas stream after it has been treated to remove the methane and argon.

3. A process as claimed in claim 2 in which helium is separated from the bleed stream.

4. A process as claimed in claim 3 in which the stream resulting from removing the helium from the bleed stream is returned to the reactor.

5. A process as claimed in claim 1 in which the bleed stream is removed from the purge gas stream before it has been treated to remove the methane and argon.

References Cited

UNITED STATES PATENTS 2,610,106   9/1952   Gray   23—199

FOREIGN PATENTS 1,057,020   2/1967   Great Britain   23—198

OSCAR R. VERTIZ, Primary Examiner

H. S. MILLER, Assistant Examiner